UNITED STATES PATENT OFFICE.

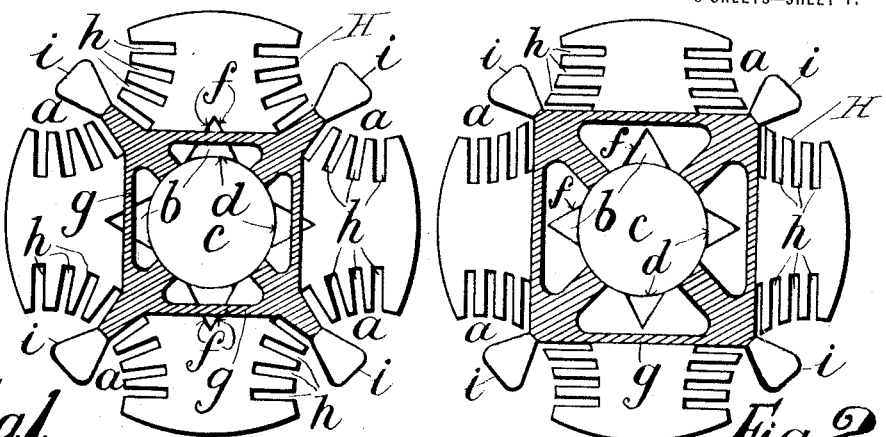
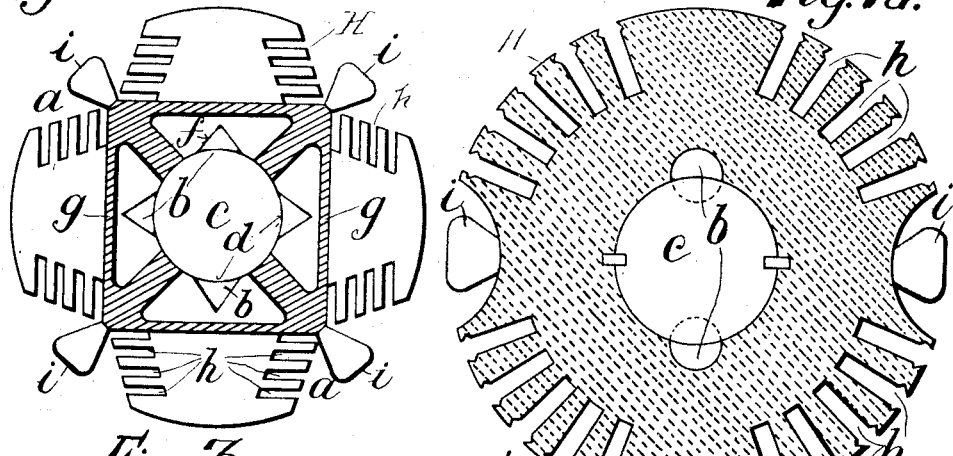
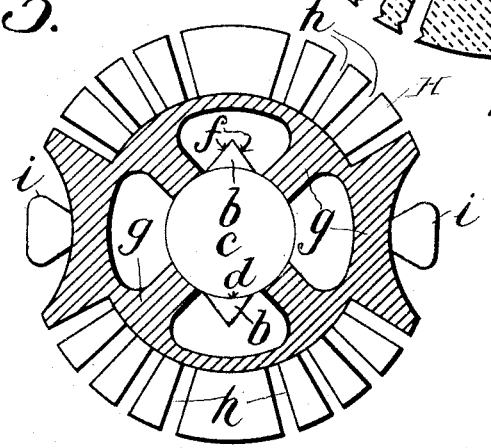

RICHARD AMBROSE HOLBECH, OF ELLESMERE, ENGLAND, ASSIGNOR TO ARTHUR ROLFE, OF LONDON, ENGLAND.

DYNAMO-ELECTRIC MACHINERY.

1,193,897.  Specification of Letters Patent.  Patented Aug. 8, 1916.

Application filed July 29, 1911. Serial No. 641,267.

*To all whom it may concern:*

Be it known that I, RICHARD AMBROSE HOLBECH, subject of the King of Great Britain and Ireland, and resident of Ellesmere, in the county of Shropshire, England, have invented certain new and useful Improvements in or Relating to Dynamo-Electric Machinery, of which the following is a specification.

My invention has reference to improvements in or relating to dynamo-electric machinery of that type provided with revolving field magnets and particularly to high speed alternators and has for its object to provide improved means or constructions for cooling the entire machine when in operation so that a greater output of electric current can be obtained than is the case at present in these machines.

My invention is based mainly upon the following facts:—1. An electromagnet is made by passing an electric current around a coil of electric conductors, the center of which is occupied by an iron or steel core. 2. Magnetism passes much more readily through iron or steel than through air and 3. Magnetism travels in circles around an electric conductor carrying a current, therefore the easiest path for a magnetic circuit will be along, around or in iron or steel circles, *i. e.* rings. Advantage is taken of these facts to provide means to cool and thoroughly ventilate dynamo electric machines and especially high speed machines having few poles. These means will be fully described with reference to the accompanying drawings or diagrams, which are given by way of example to indicate how my invention may be carried out.

Figure 6:
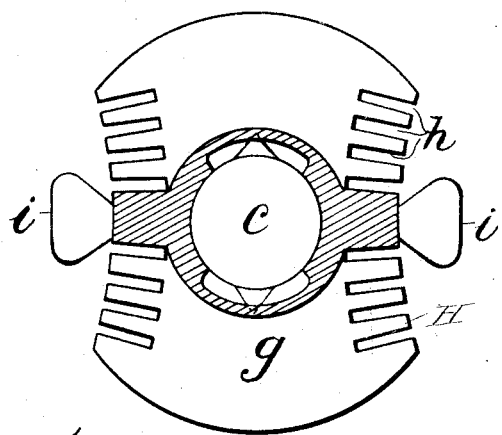
Figure 7:
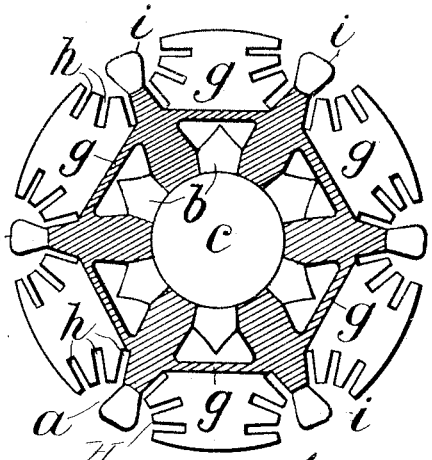
Figure 8:
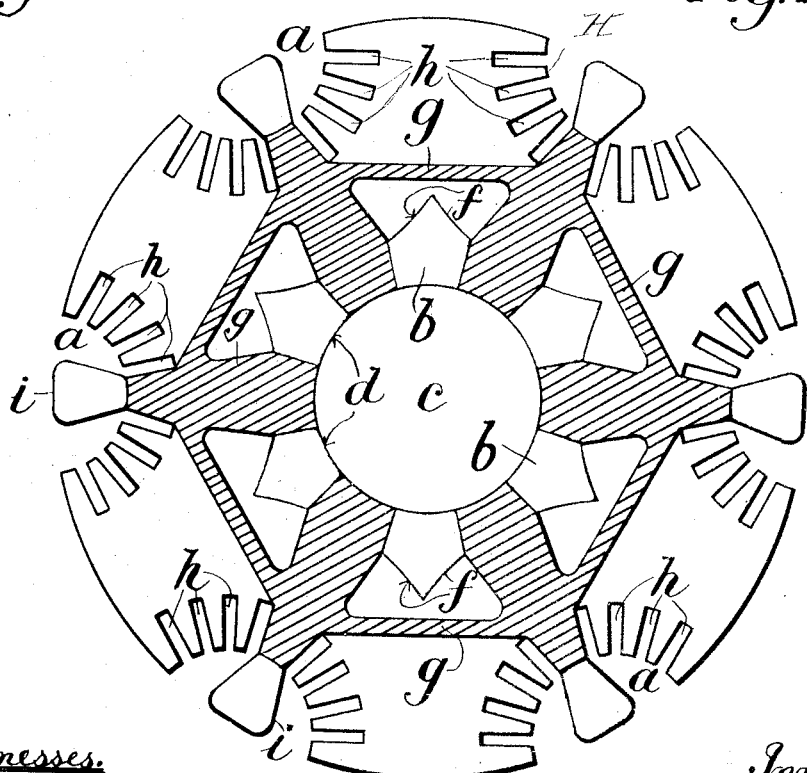
Figure 9:
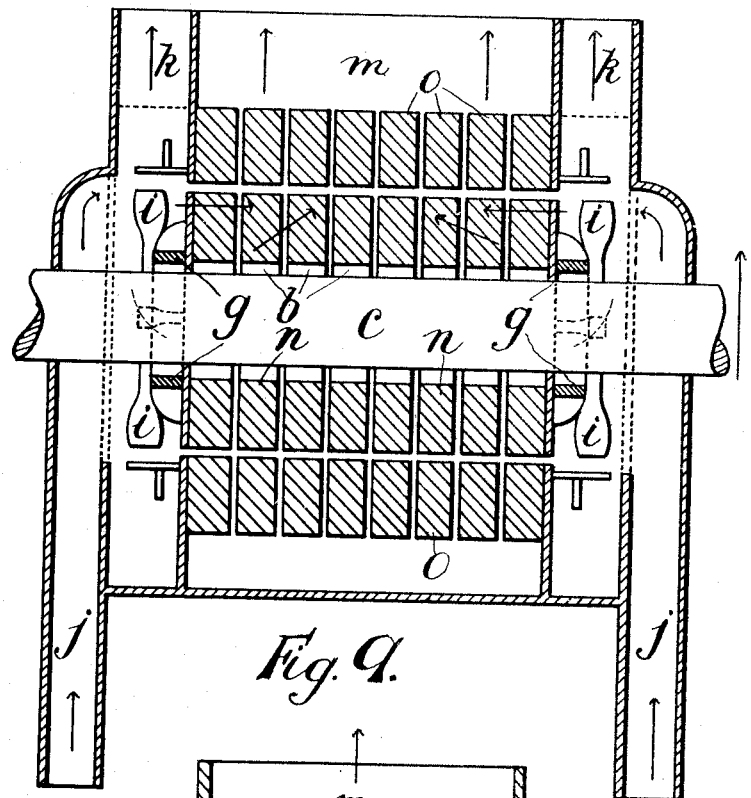
Figure 10:
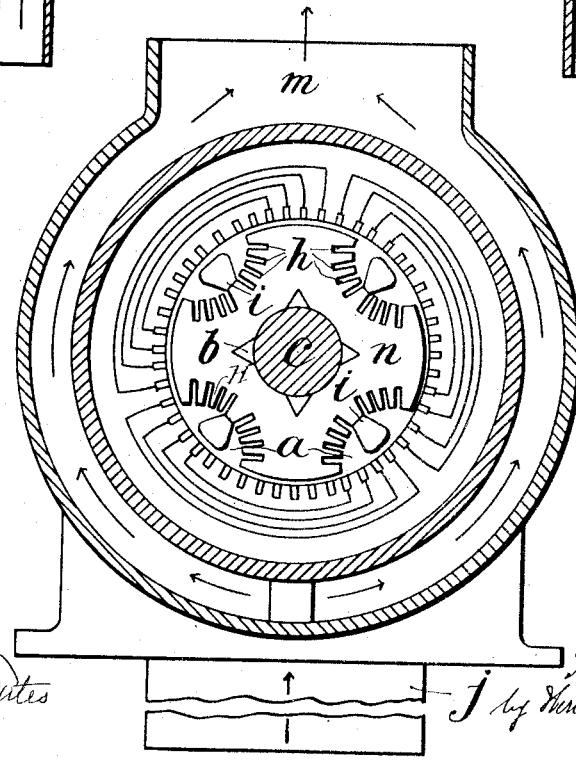

In these drawings:—Figures 1 to 3 are end elevations of four-pole rotors with different arrangements of winding slots. Figs. 4 to 6 similar views of different two-pole rotors and Figs. 7 and 8 similar views of different six-pole rotors, while Fig. 9 is a longitudinal section through a dynamo; and Fig. 10 is a cross-section through the same.

The improved means forming the subject of my invention consist in an alteration in the shape of the rotor and in means in conjunction therewith for establishing a current of air along or around the rotor and between it and the stator in an improved way, such current or currents passing away through the usual grooves or ducts formed in the rotor and stator, respectively. The improvements in connection with the rotor, as will be gathered from Figs. 1 to 8, consist in cutting it away at its periphery in two or more places $a$ so as to leave spaces through which currents of air can be drawn, such cut-away portions being usually of curved formation looked at in end elevation, the curvature or shape being adapted to correspond to or be concentric with the magnetic path. I would, however, have it understood that while this seems to me the most practical way the cut-away portions may be of other shape but generally so as to conform substantially to the curved path of the magnetism previously referred to. Thus the spaces may be of V-shape, the angle varying with the size of the rotor and with the number of air spaces which may be formed in the latter. I prefer the circular formation in as much as the cut-away portions form part of a true magnetic circle, the other part of which is completed by the stationary armature or stator and the air gap between the latter and the rotor.

In addition to the air gaps formed in the periphery of the rotor I arrange further air spaces $b$ along or adjacent to the shaft $c$ upon which the rotor is mounted, such spaces being of any convenient shape. They may be triangular with the bases $d$ against the shaft $c$ the other two sides $f$ of the triangle being opposite to the curved spaces $a$ formed at the periphery of the rotor. In fact they may be substantially concentric therewith thus departing slightly from the triangular formation. In Fig. 4 the spaces $b$ are semi-circular and in order to obtain a greater area of passage the circle may be completed by forming a similar groove opposite each longitudinally in the shaft $c$, as indicated by broken lines. The inner ducts and the outer ducts should be the same in number and also be equal to the number of N and S poles.

In a rotor constructed as herein described the windings may be supported upon or clamped to saddle pieces $g$ secured firmly to the rotor shaft $c$. The windings (not shown) may be of any suitable character. The slots $h$ I consider most suitable to receive the windings in such a rotor are those which are formed radially or substantially so, to the curved cut-out portions *a* at its periphery as in Figs. 1, 2, 6, 7 and 8. Such slots are best both electrically, magnetically and mechanically. Other forms of slots as in Figs. 3, 4 and 5 may, however, be used. Each pole piece is provided with a series of slots *h* forming teeth H for holding the windings apart and permitting air to be forced between them.

In order to create a current or currents of air through the air spaces *a* formed as hereinbefore described I may conveniently employ a fan or other draft-inducing means. Where a fan construction is adopted the blades *i* may be of any suitable material, preferably non-magnetic, and efficient formation as to angle or curvature and area of blades and be suitably secured to the rotor at the ends and be centrally located opposite the air spaces *a* in the latter, as shown in the drawings. It will thus be seen that if the stator core air ducts are sufficiently numerous and of good area a very powerful draft will be set up through the improved peripheral and axial air spaces of the machine so as to cool the whole of the parts. The improved air spaces or ducts do not in any way interfere with the true magnetic path and consequently the maximum magnetism is obtained from a minimum amount of material *i. e.* iron (or steel). Also more ampere-turns (magnetizing current) can be put on the rotor, using less copper than is usual on account of the greater cooling effect.

The fans or other draft-inducing means can be arranged so that the stator end-windings can be cooled as well as the interior of the machine and so that the cool air is drawn in at both ends and sent out through the stator radially or through a chimney. The cool air enters by passages *j* at the ends of the machine, and is forced in opposite directions against the end portions of the rotor *n* and the stator *o*, passing off by a central outlet *m*. Side outlets *k* are also provided for permitting a portion of the air to escape, when desirable, without passing through the windings.

What I claim as my invention and desire to secure by Letters Patent is:—

1. In a dynamo-electric machine, a rotating magnet with salient poles adapted to act as a centrifugal fan to force the air in the inter-polar spaces radially in an outward direction, inlets to said inter-polar spaces and means for forcing air through said inter-polar spaces, axially with respect to the said magnet to impinge against the air moving radially in the inter-polar spaces at right angles thereto.

2. The combination with a stator provided with radial air ducts, an inclosing casing having end air inlet passages and an intermediate outlet passage, a driving shaft journaled coaxially of the stator, a rotor secured on said shaft and including pole pieces, said rotor having peripherally thereof spaced-apart longitudinally extending channels extending from end to end thereof, and arranged substantially concentric to the magnetic path, and having radial air passages spaced-apart along the length thereof, and being further provided with internal longitudinally extending air channels, said longitudinal internal and peripheral channels intersecting the radial air passages, and said inner air channels being disposed in a plane extending between the peripheral channels, said pole pieces having spaced-apart teeth, the spaces between the teeth communicating with the adjacent peripheral channels and extending radially in reference thereto, and being adapted to receive the windings, and fans secured to the shaft at opposite ends of the rotor for forcing air currents through the channels toward the middle of the rotor, said air currents causing pressure on the interpolar air at right angles to the air currents through the radial passageway or ducts.

In testimony whereof I have hereunto set my hand in the presence of two witnesses.

RICHARD AMBROSE HOLBECH.

Witnesses:
HERBERT EDWARD NORRIS,
FREDERICK SAINT.